US008798015B2

(12) United States Patent
Herrmann et al.

(10) Patent No.: US 8,798,015 B2
(45) Date of Patent: Aug. 5, 2014

(54) TRANSMISSION OF DATA PACKETS FROM A TRANSMITTER TO A RECEIVER

(75) Inventors: Christoph Herrmann, Aachen (DE); Patrick Nickel, Doersdorf (DE)

(73) Assignees: Koninklijke Philips N.V., Eindhoven (NL); Sharp Corporation, Osaka (JP)

( * ) Notice: Subject to any disclaimer, the term of this patent is extended or adjusted under 35 U.S.C. 154(b) by 1056 days.

(21) Appl. No.: 10/563,928

(22) PCT Filed: Jul. 1, 2004

(86) PCT No.: PCT/IB2004/051082
§ 371 (c)(1),
(2), (4) Date: Jan. 9, 2006

(87) PCT Pub. No.: WO2005/006640
PCT Pub. Date: Jan. 20, 2005

(65) Prior Publication Data
US 2007/0115894 A1   May 24, 2007

(30) Foreign Application Priority Data
Jul. 11, 2003  (EP) ..................................... 03102123

(51) Int. Cl.
*H04W 4/00*            (2009.01)
(52) U.S. Cl.
USPC ......................................................... 370/338
(58) Field of Classification Search
USPC .................................. 370/389, 394, 329, 338
See application file for complete search history.

(56) References Cited

U.S. PATENT DOCUMENTS

| 4,312,065 | A  | * | 1/1982 | Ulug ............................. 370/230 |
| 5,717,688 | A  | * | 2/1998 | Belanger et al. .............. 370/331 |
| 5,754,754 | A  | * | 5/1998 | Dudley et al. .................... 714/18 |
| 6,389,016 | B1 | * | 5/2002 | Sabaa et al. .................... 370/389 |
| 7,249,303 | B2 | * | 7/2007 | Dottling et al. ................. 714/748 |
| 7,414,989 | B2 | * | 8/2008 | Kuchibhotla et al. .......... 370/329 |
| 2003/0023746 | A1 | * | 1/2003 | Loguinov ....................... 709/235 |
| 2003/0043764 | A1 | * | 3/2003 | Kim et al. ...................... 370/329 |
| 2003/0099211 | A1 |   | 5/2003 | Moulsley et al. |
| 2003/0120802 | A1 | * | 6/2003 | Kohno .......................... 709/237 |

FOREIGN PATENT DOCUMENTS

JP    2002135233    5/2002

OTHER PUBLICATIONS

Philips, "Text Proposal for TR25.858 for ACK/NACK/REVERT Commands" 3GPP TSG RAN WG1-24, TDOC R1-02-350, Feb. 18-22, 2002.
Philips, "Error-Recovery for S&W in HSDPA", TSG-RAN Working Group 2, TSGR2#224(01)2366, New York, USA, Oct. 22-26, 2001.

(Continued)

*Primary Examiner* — Mark Rinehart
*Assistant Examiner* — Mohammad Anwar (57) ABSTRACT

Due to NACK-to-ACK misinterpretations in base stations, packets are lost, and there may be gaps in a re-ordering buffer of a base station. According to the present invention, when the receiver decodes—possibly after some retransmissions—a first data packet without an error, which first data packet is sent along with an indicator indicating that the first data packet is a new data packet, after the receiver has sent a negative confirmation message (NACK) with respect to a second data packet, the receiver sends a Revert (REV) message to the transmitter. The REV message informs the base station that the first data packet was decoded error-free, and that the second data packet is still missing on the receiving side so that the base station may re-send this second data packet.

21 Claims, 3 Drawing Sheets (56) References Cited

OTHER PUBLICATIONS

Philips, "Performance of ACK/NACK Signalling", TSG RAN WG1 #22, TSGR1(01)1198, Jeju, South Korea, Nov. 19-23, 2001.

Rapporteur, "TR 25.858 V 1.1.0, R1-02-0435", Feb. 18-22, 2002, Orlando, FL.

C. Hermann et al., "Improving Packet Loss Probability in the UMTS High-Speed Downlink", Vehicular Technology Conference (VTC), Oct. 6-9, 2003, IEEE 58th, Orlando, FL, USA, pp. 2655-2659.

\* cited by examiner

TRANSMISSION OF DATA PACKETS FROM A TRANSMITTER TO A RECEIVER

The present invention relates to the field of packet switched data transmission, in particular in radio mobile communication systems. More specifically, the present invention relates to a method of transmitting data packets from a transmitter to a receiver, to a system for transmitting data packets from a transmitter to a receiver, to a base station for mobile radio communication systems, to a mobile subscriber station for a mobile radio communication system and to a computer program for controlling a transmission of data packets from a transmitter to a receiver of a mobile radio communication system.

A method and system for transmitting data packets between a transmitter and a receiver is, for example, known from "Tdoc 12A010024, signaling and timing constellations for HS-DSCH, source: Lucent technologies, 3GPP TSG RAN WG1 & WG2 Meeting on HSDPA, Sophia Antipolis, Apr. 5-6, 2001.

In accordance with this known system, the receiver sends a positive confirmation message to the transmitter in case the receiver has received a data packet without an error. In case the receiver received a data packet with an error, the receiver sends a negative confirmation message to the transmitter. When the transmitter receives a positive confirmation message, it will continue with the transmission of a new data packet. In case the transmitter received a negative confirmation message, it re-sends the respective data packet.

In case the transmitter erroneously interprets a negative confirmation message from the receiver as a positive confirmation message, and continues with the transmission of a new data packet, the information of the data packet, which was received from the receiver with an error and for which the negative confirmation message was sent, is lost.

It is an object of the present invention to provide for an improved error handling.

According to an exemplary embodiment of the present invention, the above object may be solved by a method of transmitting data packets from a transceiver to a receiver in accordance with claim 1. According to this exemplary embodiment of the present invention, an indicator is sent along with each data packet, which indicates whether the respective data packet is a new data packet or a re-sent data packet. When the receiver receives a data packet with an error, the receiver sends a first confirmation message to the transmitter. When the receiver receives a first data packet without an error, along with the indicator, indicating that the first data packet is a new data packet, after the receiver has sent the first confirmation message with respect to a second data packet, the receiver sends a second confirmation message to the transmitter. According to an aspect of the present invention, this second confirmation message requests the transmitter to re-send the second data packet.

Advantageously, the above exemplary embodiment of the present invention may allow to avoid that, due to the erroneous interpretation of the negative confirmation message or negative acknowledgement as a positive confirmation message by the transmitter, data is not received by the receiver. In other words, the present invention may allow to ensure that, even if such misinterpretation of the negative confirmation message happens, the respective data packet is re-transmitted, such that it can be received by the receiver without error. Furthermore, this allows that there are no gaps in a reception buffer of the receiver.

According to an exemplary embodiment of the present invention as set forth in claim 1, the receiver sends a third confirmation message to the transmitter in case the receiver receives an error-free data packet. This confirmation message may also be referred to as positive confirmation message or positive acknowledgement. Advantageously, according to this exemplary embodiment of the present invention, a transmission method is provided, where transmissions with errors are repeated and which deals even with the case that a negative confirmation message is interpreted as a positive confirmation message.

According to other exemplary embodiment of the present invention as set forth in claims 3 and 4, the second data packet which is re-sent by the transmitter after reception of the second confirmation message is either sent with the complete data originally included in this data packet, or with only part of the data originally included in the original data packet, or even without data. Advantageously, this may allow to increase the chance of successful decoding.

According to another exemplary embodiment of the present invention as set forth in claim 5, instead of re-sending the second data packet, the transmitter ignores the third confirmation message and sends a new third data packet.

According to another exemplary embodiment of the present invention as set forth in claim 6, the indicator has a very short length of one bit.

According to another exemplary embodiment of the present invention as set forth in claim 7, the message is an extension of the HARQ protocol in UMTS (Universal Mobile Telecommunications System).

According to another exemplary embodiment of the present invention as set forth in claim 8, a system is provided for transmitting data packets from a transmitter to a receiver. Advantageously, this system may ensure that even in the case that a negative confirmation message sent from the receiver to the transmitter is erroneously interpreted as a positive confirmation message, no information is lost and no gap is generated in a receiving buffer of the receiver.

According to another exemplary embodiment of the present invention as set forth in claim 9, the system is a UMTS mobile telecommunications system and the indicator is the New Data Indicator of length 1 bit, which is sent via the high speed shared control channel of UMTS.

According to another exemplary embodiment of the present invention as set forth in claim 10, a base station for a mobile radio communication system is provided, which allows for an improved error handling. According to another exemplary embodiment of the present invention as set forth in claim 11, a mobile subscriber station for a mobile radio communication system is provided, which may allow for an improved error handling while a very short length of a new data indicator may be ensured.

The present invention relates also to a computer program for, for example, a mobile radio communication system, for controlling a transmission of data packet from a transmitter to a receiver, as set forth in claim 10. The computer program according to the present invention, is preferably loaded into a working memory of a control processor of the mobile radio communication system. However, it may also be spread on a plurality of processors throughout the mobile radio communication system. This or these data processors are thus equipped to carry out the method of the invention. The computer program may be stored on a computer readable medium, such as a CD-ROM. The computer program may also be presented over a network such as the WorldWideWeb, and may be downloaded into the working memory of a data processor of such a network.

It may be seen as the gist of an exemplary embodiment of the present invention that, when the receiver finally receives a first data packet (possibly after a number of retransmissions) without an error along with the indicator indicating that the first data packet is a new data packet, after the receiver has sent a negative confirmation message with respect to a second data packet, the receiver sends a REV confirmation message to the transmitter. This REV confirmation message causes the transmitter to re-send the second data packet. Advantageously, this allows for an improved error handling, while having a new data indicator with a very short length. For example, in the case of a UMTS system, the new data indicator has a length of only one bit.

These and other aspects of the present invention are apparent from and will be elucidated with reference to the embodiments described hereinafter and with reference to the following drawings.

Figure 1:
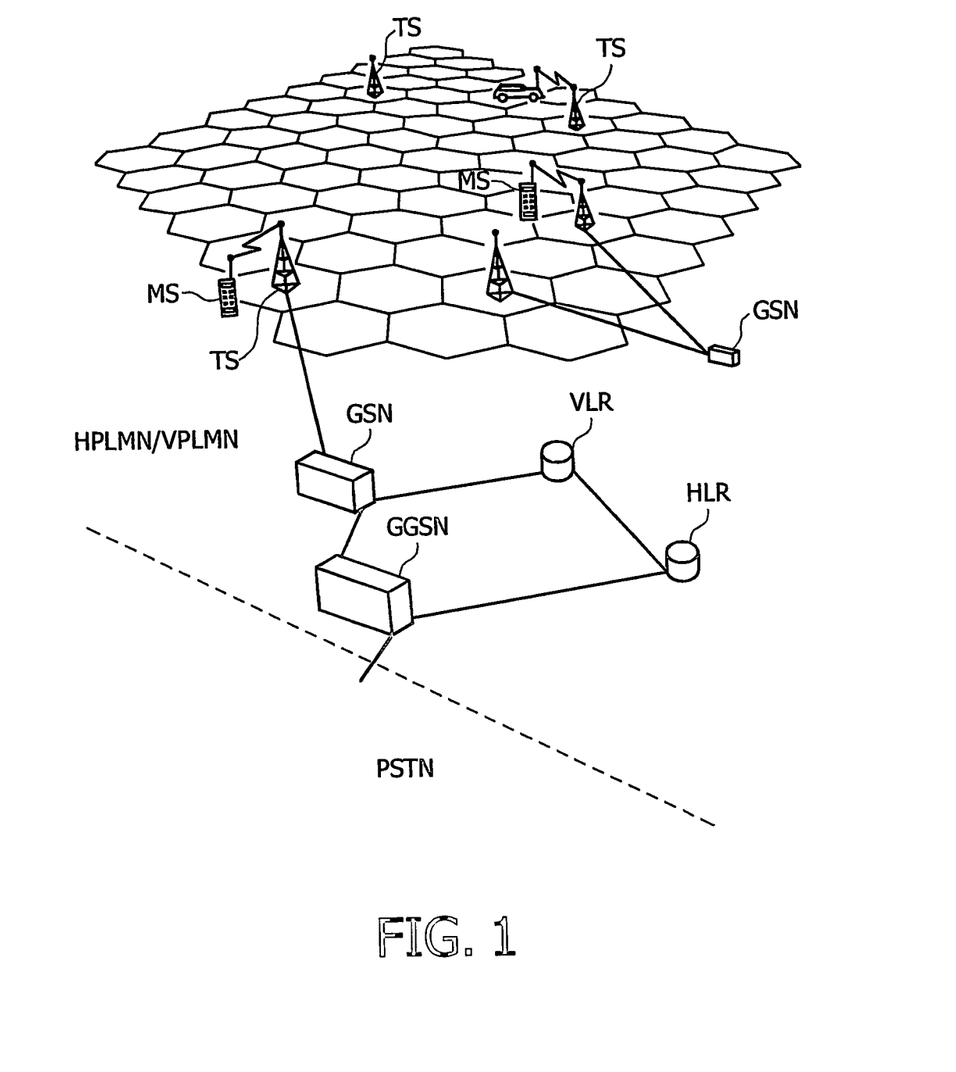
FIG. 1 shows a simplified representation of a mobile radio communication system, including a base station and a mobile subscriber station in accordance with an exemplary embodiment of the present invention.

FIG. 1 shows components of a mobile radio communication system, such as a digital cellular telecommunications system in accordance with an exemplary embodiment of the present invention. In particular, FIG. 1 shows 2 classes of networks, i.e. part of a fixed network such as a public switch telephone network PSTN, like a national telephone network, an integrated services digital network ISDN or a packet switch public data network PSPDN and a public land mobile network PLMN, like a UMTS mobile radio communication system. To link these networks, there is provided a gateway GPRS support node GGSN, which serves to determine specific locations of a mobile station MS in the digital cellular telecommunications system and to route calls towards this mobile station MS.

To this end, the GGSN is connected to a functional unit called Home Location Register HLR, wherein two types of information are stored. Subscriber information and mobile information to allow incoming calls to be routed to the mobile station MS. Any administrative action by the network operator with respect to mobile station data is carried out in the Home Location Register HLR.

To route a call to a mobile station MS, the GGSN is also connected to a GPRS support node GSN, through which the mobile station MS may obtain a service. The GSN performs the necessary switching services required for mobile stations MS covered by this GSN. Also, the GSN monitors the mobility of this mobile station MS and manages necessary resources required to handle an update of the location registration procedures. As may be seen from FIG. 1, the public land mobile network comprises a plurality of GSNs, each covering a pre-determined number of basic cells covering an area wherein a mobile station MS can move. To this end, each GSN is connected to a visitor location register VLR. The visitor location register VLR is a functional unit, which dynamically stores mobile station information, such as a location area in case the mobile station is located in the area covered by the visitor location register VLR. When a roaming mobile station MS enters an area assigned to a specific GSN, the GSN informs the associated visitor location register VLR about the mobile station MS.

In addition, the radio network system RNS corresponds to physical equipment providing radio coverage to prescribed geographical areas known as cells and shown a hexagonal geographical regions in FIG. 1. Such physical equipment comprises transmitters TS, which implement the transmission of the data to the mobile station MS via the air channel.

Each RNS contains equipment required to communicate with the mobile station MS. Functionally, an RNS provides control functions carried out by a radio network controller RNC and a transmitting function performed by the so-called NodeB. The NodeB corresponds to a radio transmission request and covers each cell. This may also be referred to as transmitter TS. An RNS may serve several cells, because it can have multiple base transceiver systems NodeB.

The transmitter TS, the GGSN, the HLR, the GSN, the VLR, the NodeB, the RNS and the RNC may all be referred to as base station, comprising a transmitter for the following description of an exemplary embodiment of the present invention.

The mobile radio communication system depicted in FIG. 1 may be operated such that data packets are transmitted between a transmitter (base station) and a receiver (mobile station MS). According to an exemplary embodiment of the present invention, such packet transmission may be performed in accordance with the data transmission system described in 3 GPP TS 25 308 V5.3.0 (2002-12) Technical Specification, $3^{rd}$ Generation Partnership Project; Technical Specification Group Radio Access Network; High Speed Downlink Packet Access (HSDPA); overall description; Stage 2 (Release 5) and 3GPP TS 25.321 V5.30 (2002-12) Technical Specification $3^{rd}$ Generation Partnership Project, Technical Specification Group Radio Access Network; MAC protocol specification (Release 5), which are both hereby incorporated by reference.

Such data transmission systems perform a high speed data transmission in the DL (Downlink: from the base station (transmitter) to the mobile station (receiver), via the HS-DSCH (High Speed Downlink Shared Channel)). Such data packets are transmitted in time slots with a length of approximately 2 milliseconds. Those time slots are usually referred to as transmission time intervals or TTI. Each of the plurality of data packets sent to the receiver are confirmed or acknowledged after each transmission. According to an aspect of the present invention, in case a data packet was successfully received, i.e. received without an error, a positive confirmation message (ACK) is sent in the UL (up-link: from the receiver to the base station). In case a data packet was not successfully received, i.e. was received with an error, a negative confirmation message (NACK) is sent from the receiver to the transmitter. Due to a fixed pre-defined time relation between the reception of the data packet and the transmission of the positive and negative confirmation message packets to the transmitter, there is a clear relationship between a data packet and the status message (ACK or NACK), which refers to this data packet.

Channel decoding of a received packet is done in the considered system based on a so-called soft decision, i.e. the received bit values are characterized according to their quantized amplitudes, and these quantized amplitudes the so-called soft bits, form the input values for the channel decoding process (i.e. convolutional or Turbo decoding).

The soft bits of a data packet, which the MS cannot decode error-free, are stored in a so-called soft buffer, and by means of a NACK, the MS requests a retransmission for this data packet. Such a retransmission may consist of an exact copy of this data packet. In this case, the soft bits of the retransmission are added to the soft bits, which are already contained in the soft buffer. Then channel decoding is applied anew to the vector of summed soft bits. The addition of soft bits is often referred to as soft combining.

In case the base station or transmitter receives a negative confirmation message NACK from the receiver, the base station may decide whether this particular data packet should be re-sent or whether a transmission of new data should be started. For example, the base station may decide, after the reception of a negative confirmation message, to stop the re-sending of this particular data packet, when a prescribed number of attempts to send this particular data packet to the receiver has been reached. Thus, it may be avoided that the transmission path is blocked, due to a data packet, which cannot be successfully received or decoded by the receiver.

In order to indicate to the receiver that a transmission carries data that was already sent or new data, and hence to also distinguish between the above two cases, namely the re-sending of the unsuccessfully received data packet or the abortion of the re-sending, and for other purposes, there is provided a separate channel, namely the HS-SCCH (High Speed Shared Control Channel). According to an aspect of the present invention, via the HS-SCCH, the 1-bit indicator NDI as defined in the UMTS standard, can be left unchanged, i.e. it is transmitted from the transmitter to the receiver along with each data packet, and indicates—relative to the value of the NDI of a previous transmission—whether the data packet is a re-sent data packet, i.e. a data packet, which has unsuccessfully been sent to the receiver before, and then the NDI has the same value as the NDI of the previous transmission, or whether the data packet contains new data, and then the NDI is toggled compared with the previous transmission.

In order to ensure that the system is not blocked by resending unsuccessfully received data packets, so that no really continuous stream comes into being, up to eight individual processes may be configured, which are served in the time multiplex. Such processes are usually referred to as HARQ processes (hybrid automatic repeat request processes). Those HARQ process identities are also transmitted via the HS-SCCH. Due to this, it can be determined accurately, to which first transmission and HARQ process a respective re-sent data packet belongs.

According to an aspect of the present invention, it has to be ensured that the data packets received by the receiver are delivered in the correct order to the further processing. For this, there is provided a storing means or memory, in which the incoming correctly decoded data packets are re-sorted in accordance with their respective transmission sequence number. However, it may occur that there are gaps in this memory. Those gaps are caused by missing data packets, which have not been successfully received.

In particular, such gaps may occur for the following two reasons:

The base station decides to no longer re-transmit a data packet, in spite of the fact that this data packet has not been successfully received, i.e. error-free, by the receiver. This case may also be referred to as abortion.

A gap may also occur when the base station or network erroneously receives or interprets a negative confirmation message NACK as a positive confirmation message ACK and erroneously assumes that this particular data packet has been successfully received by the receiver.

In both of the above cases, a permanent gap may occur in the storage or memory, since one of the data packets has not been successfully sent to the receiver.

Figure 2:
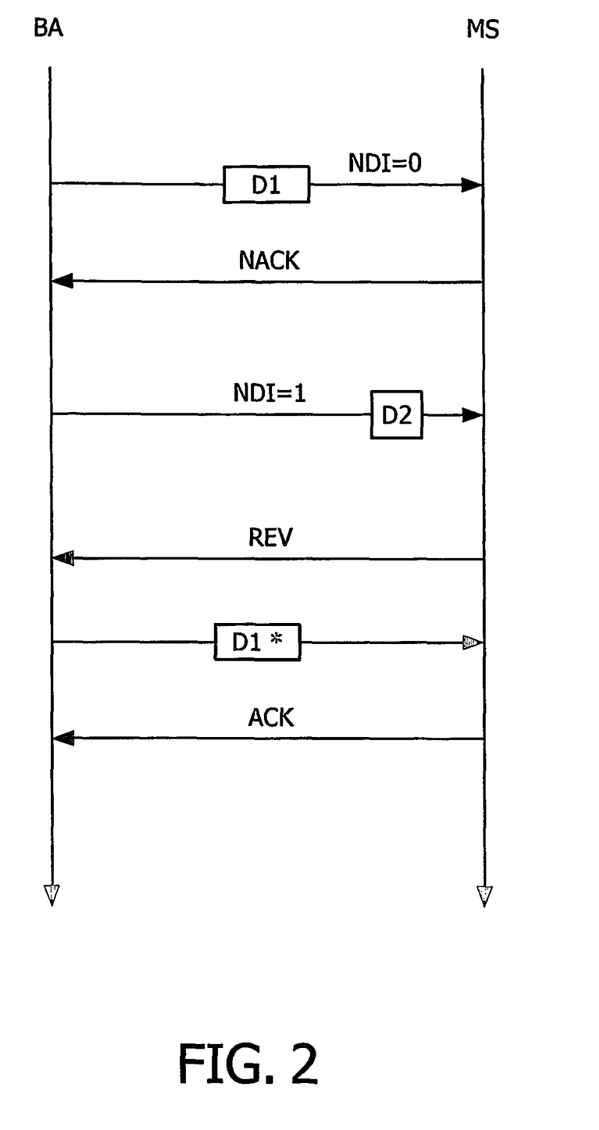
FIG. 2 shows a simplified time diagram, depicting a communication between a base station and a mobile station in the mobile radio communication system depicted in FIG. 1 in accordance with an exemplary embodiment of the present invention.

FIG. 2 shows a simplified time chart sketching the method of transmitting data packets from a transmitter (BA or based station), to a receiver (MS or mobile station).

As may be taken from FIG. 2, the BA sends a first data packet D1 to the MS. Along with the data packet D1, the indicator NDI is sent, which has here the value 0. As indicated above, the NDI is transmitted via a separate channel, namely the HS-SCCH.

As may be taken from FIG. 2, the data packet D1 is unsuccessfully received by the MS. In other words, the data packet D1 is received with an error at the MS.

In response to the unsuccessfully received data packet D1, the MS sends a negative confirmation message NACK to the BA, by which it requests a retransmission.

There are two cases which may now occur in the BA.

1. The BA decides not to re-send the data packet D1, due to the fact that, for example, a pre-set number of unsuccessful attempts has been made to send the data packet D1 to the MS. This is the abortion described above. Then, as also described above, the BA sends a new data packet D2 to the MS along with the indicator NDI. Since the data packet D2 is a new data packet, the NDI is toggled compared with the previous transmission of D1, i.e. NDI=1.

2. The second case that may occur is that the BA misinterprets the negative confirmation message NACK (sent in reply to the unsuccessful decoding of D1) as a positive confirmation message ACK. Such misinterpretation may occur due to an unsuccessful reception of the negative confirmation message at the BA or a misinterpretation of the negative confirmation NACK by the BA. Due to this, the BA sends to the MS the new data packet D2 along with an NDI, which is toggled compared with the value of the NDI, when the previous packet D1 was sent, which packet D1 the BA erroneously assumes to have been received error-free, i.e. NDI=1.

For the MS, the NDI, (i.e. here NDI=1) received together with D2, is unexpected, due to the previous negative confirmation message NACK, which was sent in order to request a retransmission of a packet that was sent with NDI=0. Normally, the MS would have expected a retransmission of the former data packet D1 along with an NDI=0.

In response to the unexpected indicator NDI, the MS overwrites any entries in its reception buffer or memory with the content of the data packet D2. It is now assumed that the data packet D2 has been successfully received, i.e. has been received without an error.

Now, instead of transmitting a positive confirmation message ACK with respect to the new data packet D2 to the BA, in accordance with an aspect of the present invention, the MS transmits a REV message to the BA.

In other words, when the MS—possibly after a number of retransmissions—finally successfully decodes the new data packet D2 along with the unexpected indicator NDI=1, indicating that the data packet D2 is a new data packet, after the MS has sent a negative confirmation message NACK with respect to the data packet D1, the MS sends the REV message to the transmitter.

The REV message informs the BA about the fact that there is a gap in the reception buffer or memory of the MS. In other words, the REV informs the BA about the fact that the data packet (here D1) immediately sent before the data packet, whose reception is positively acknowledged by means of the REV message (here D2) has not been successfully received by the MS and thus the data content of D1 is missing in the MS. Hence, the REV message indicates two different things to the BA:

a) a positive confirmation (ACK) for the data packet D2, in reply to which the REV was sent, and b) an indication that the data packet sent immediately before the data packet D2, is still missing, and should be retransmitted.

In response to such REV message, the BA may re-send the data packet D1 as indicated by D1* in FIG. 2. D1* is transmitted along with an NDI value, which is toggled compared with the NDI, which was used for transmission of D2, i.e. with NDI=0. In case the MS successfully receives the data packet D1*, the MS returns a positive confirmation message ACK to the BA.

As indicated in FIG. 2, upon reception of the confirmation message REV, the BA may re-send data packet D1*. The data packet D1* may also be the data packet D1, which was originally sent from the BA to the MS. However, according to an aspect of the present invention, the data packet D1* may be filled only with a part of the data originally contained in the original data packet D1, or may be empty.

The BA may also delay transmission of D1* and send it later on. Then, the NDI has to be set according to the rule that the NDI of a new transmission is toggled compared with the previous transmission, which might have been successful or might have been aborted.

According to another exemplary embodiment of the present invention, the BA does not re-send any of D1 or D1*, but ignores the request for retransmission expressed by the REV message and starts the transmission of a new data packet along with the same NDI, as would be used to re-send D1 or D1*, i.e. with an NDI value, which is toggled compared with the NDI, which was used for transmission of D2, and hence with NDI=0. In this case, it may be sufficient for the BA to know that there is a gap in the buffer of the MS, i.e. that one of the preceding packet transmissions has been unsuccessful. In some applications, this knowledge alone may be sufficient and, for example, such missing data may be interpolated on a higher level.

According to an aspect of the present invention, it is possible to have an NDI which has a length of only 1 bit. It has an initial value (i.e. NDI=0 according to the UMTS standard TS 25.321, 3$^{rd}$ Generation Partnership Project, Technical Specification Group Radio Access Network; NAC protocol specification (Release 5), which is hereby incorporated by reference), and for each new data packet the NDI is toggled compared with the previous transmission. For a re-transmission of a data packet, the NDI has the same value as the NDI used for the initial transmission of this data packet.

As indicated above, according to this exemplary embodiment of the present invention, it may be ensured that the data packets received by the MS may be given to a higher level or to further preceding in the correct order. Furthermore, for example, to increase the chance of successfully decoding the data packet re-sent in response to the REV message, may contain only part of the data content originally contained in the unsuccessfully received data packet or even no data.

In the following, cases of misinterpretations of the respective confirmation messages ACK, NACK and REV are discussed and measures or provisions are provided to make arrangements against these misinterpretations.

An ACK is Erroneously Interpreted as REV

A positive confirmation message ACK for a data packet X sent by the MS is erroneously interpreted by the BA as an REV message. This REV message indicates to the BA and therewith to the whole network, that there is a gap for the data packet, which was sent directly before the data packet X In other words, the REV message indicates to the BA that the data packet sent directly before the data packet X has been unsuccessfully received by the MS. In case the BA re-sends the data packet which was not successfully received by the MS, whereby the re-sent data packet may be empty or may comprise only part of the original data or may be identical to the original data packet, an additional downlink transmission is caused, which attempts to fill the gap in the reception buffer, which actually does not exist. Here, the duplication recognition mechanism e.g. based on sequence numbers resolves the error case, which duplication recognition mechanism is anyway necessary in order to cope with the error case that the BA mis-interprets an ACK as a NACK. Such a duplication recognition mechanism is already available through the so-called transmission sequence numbers in TS 25.321.

NACK is Erroneously Interpreted as REV

The MS sends an NACK for the data packet X, which is misinterpreted by the BA as an REV message. Such REV indicates that the data packet X has been successfully received by the MS and that a data packet Y, which was transmitted, on the respective HARQ process, directly before the data packet X was not successfully received in the MS, i.e. could not be decoded by the MS. Thus, after the reception of the REV message, the BA, or the respective network control entity would attempt to close the alleged gap, i.e. to re-send the data packet Y such that there is no gap in the reception buffer. According to an aspect of the present invention, it may also occur that the BA ignores the REV message and continues with the transmission of new data packets.

However, due to the fact that the data packet X has not been correctly decoded by the MS, after the subsequent successful data packet transmission of Y, an REV message is generated, which requests the re-transmission of the data packet X.

This misinterpretation has some similarity with the misinterpretation of the NACK message as an ACK message, as depicted in FIG. 2. However, the important difference is that the misinterpretation of the NACK (sent in reply to the unsuccessful decoding of data packet X) as a REV will not cause in a data loss of data packet X, since transmission of data packet Y is done with an NDI, which the MS does not expect, since it waits for a further retransmission for data packet X. Hence, after Y has been successfully decoded, the MS would reply with a REV, by which it indicates that Y was decoded error-free and that the very data packet should be retransmitted, which was transmitted immediately before Y, and this packet is X.

In case the NACK signal was interpreted as the REV signal, the already mentioned duplication recognition mechanism would discard the unnecessarily re-transmitted data packet Y.

Figure 3:
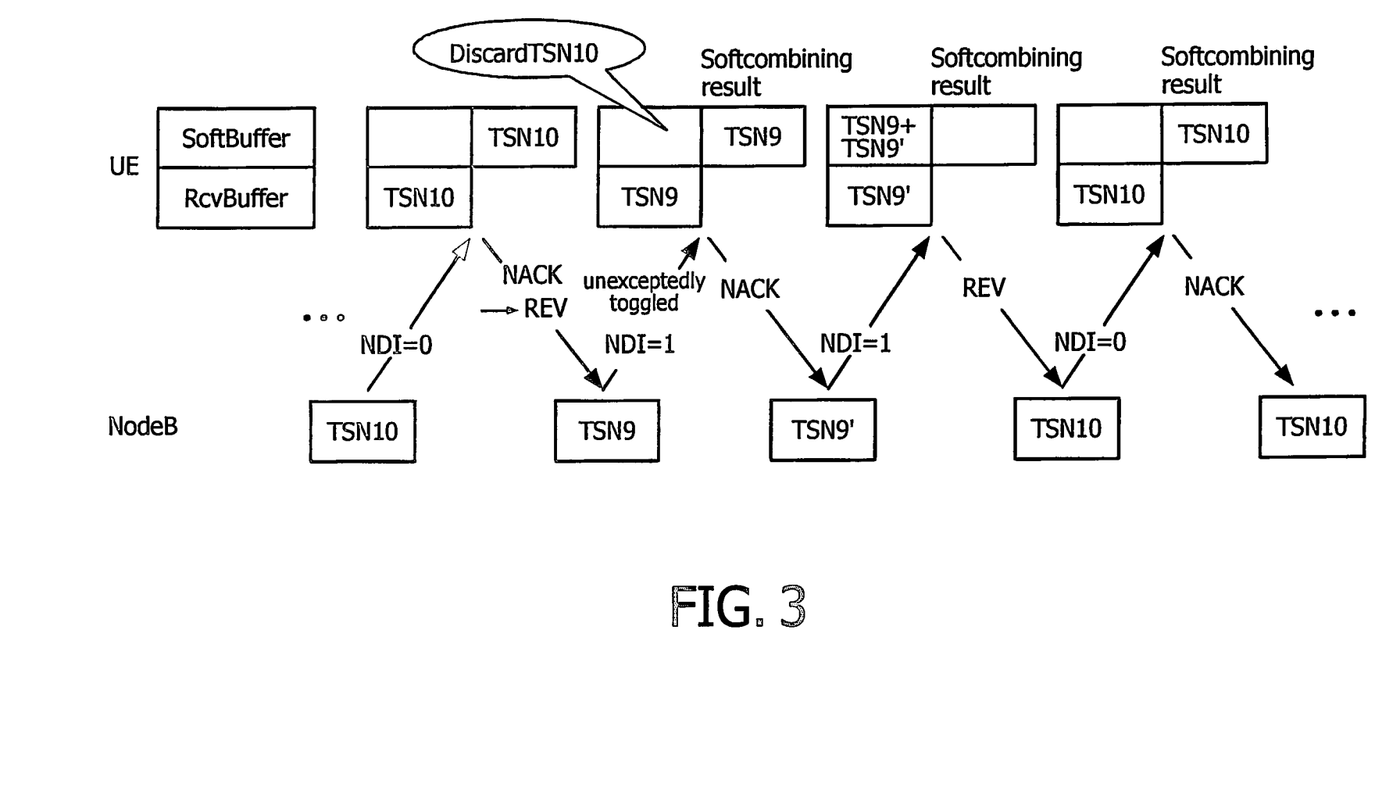
FIG. 3 shows a simplified representation of a communication between the base station and the mobile station in accordance with an exemplary embodiment of the present invention for the case of a NACK-to-REV misinterpretation.

FIG. 3 shows a simplified representation of a communication between the base station BA (such as a NodeB) and the mobile station MS (UE) in accordance with an exemplary embodiment of the present invention, for the case of a NACK-to-REV misinterpretation. In the upper part of FIG. 3, the lower line designated as RcvBuffer shows the content of the receiving buffer of the MS and the upper line designated with SoftBuffer shows the content of the soft buffer of the MS. As may be seen from FIG. 3, the BA sends the data packet with Transmission Sequence Number (TSN) 10 to the MS with the indicator ND1=0. At the MS, the soft bits of the data packet with TSN 10 is firstly written into the receiving buffer and then, as a result of decoding, moved into the soft buffer. In the MS, the data packet with TSN 10 could not be decoded error-free, such that the MS sends an NACK to the BA, which, as may be taken from FIG. 3, is erroneously interpreted as REV. Accordingly, the BA sends, to the MS, as new data (and hence with NDI=1) the data packet, which was sent (from the point in time where the BA received the REV) directly before the packet with TSN1O and which is assumed here (but not shown) to be the packet with the TSN 9. As indicated by the toggled NDI, the MS discards the SoftBuffer contents, which contains data for the packet with TSN 10.

As indicated in FIG. 3, the NDI sent along with the packet with TSN 9 is unexpected since the MS would have expected a retransmission of the packet (here with TSN 10), which it received in the previous transmission phase. It is assumed here, that the packet with TSN 9 cannot be decoded without error after its first transmission. Therefore, the MS sends a NACK to the base station in order to request a retransmission for the packet with TSN9. The base station then re-sends data for the packet with TSN 9, which is here designated by TSN 9' (in order to express, that the retransmitted data does not necessarily have to be an exact copy of the initial transmission of the packet with TSN 9; the retransmitted data could also only contain additional parity bits) together with the same new data indicator NDI=1 as used for the initial transmission of the packet with TSN 9. The MS then tries to decode the initial transmission of the packet with TSN 9 together with the retransmitted data contained in the packet with TSN 9' (expressed by TSN9+TSN9'), and here it is assumed that decoding is successful. Now, according to the present invention, the MS, after having received the error-free data of the packet with TSN 9 (i.e. the decoding result of TSN9+TSN9' showed no error), which packet has been sent along with an NDI, indicating that this data packet carries new data, after the MS has sent the NACK message with respect to the packet with TSN 10, sends the REV message to the BA, by which it positively acknowledges error-free reception of the packet with TSN 9 and asks the BA to retransmit the data packet, which it had sent directly before the packet, in reply to which it sends the REV (i.e. the packet with TSN9), which is here the packet with TSN 10. After reception of the REV message, the BA re-sends the packet with TSN 10 together with an NDI=0. In FIG. 3 it is assumed that decoding of the packet with TSN 10—which is sent after the last REV, which the BA received—is not successful in the first step, so that the MS sends a NACK, in order to ask for a retransmission for the packet with TSN 10, and the scheme continues correspondingly.

Accordingly, due to the NACK-to-REV misinterpretation, the packet with TSN 9 is unnecessarily re-transmitted, but the actually transmitted REV command causes the packet with TSN 10 to be transmitted again, so that it is not lost. Here it should be noted that—at the point in time, when the MS sends the REV—the packet actually sent immediately before the one (with TSN 9), in reply to which the MS sent the REV, is the packet with TSN 10.

REV is Erroneously Interpreted as NACK

The MS sends an REV message or signal in reply to the data packet X, i.e. in order to indicate that X was decoded successfully, and in order to request the base station to retransmit the data packet Y sent immediately before X. This REV message is erroneously interpreted as an NACK message by the base station. This only means that the base station will initiate a further (unnecessary) retransmission for packet X, which the MS ignores based on the fact that it sent a REV, and received the next transmission (which is this unnecessary retransmission of X) with an NDI, which is not toggled compared with the NDI used for the transmission, in reply to which the REV was sent.

After this unnecessary retransmission of X, the MS would again send the REV message, in order to make sure that the requested retransmission of data packet Y can be initiated, and to again positively acknowledge the successful transmission of the data packet X.

REV is Erroneously Misinterpreted as an ACK

This fourth error case will result in loss of the data packet, whose retransmission was intended by means of sending the REV. The MS cannot detect that such a misinterpretation has happened, since both, when the MS has sent a REV and when the MS has sent an ACK, it expects to receive the next packet with an NDI, which is toggled compared with the NDI it received for the data packet, in reply to which it sent an ACK or the REV.

However, the misinterpretation of a REV as an ACK can only occur, if a REV was actually sent by the MS, and this requires that some time before the BA misinterpreted a NACK as an ACK. Assuming that the REV and the NACK command were dimensioned in such a way that under usual channel conditions the probabilities of "Given a NACK was sent, the BA decodes an ACK", and "Given a REV was sent, the BA decodes an ACK" are both in the range of 1%, the probability of actually losing a packet is only in the range of 0.01%. Without the REV command, it is much more difficult to achieve this loss probability. It requires a significantly higher transmission power for the NACK than in the case of the two tier approach of sending a REV after a NACK-to-ACK misinterpretation.

Advantageously, the above described exemplary embodiment of the present invention allows for a significant reduction of the packet loss when transmitting data packets between the BA and the MS, and at the same time keeping or even reducing the required power to send a NACK. Furthermore, in case gaps are generated in the reception buffer of the MS, according to the present invention, these gaps may be filled, such that the data packets may be handed to a higher level in the correct order. Furthermore, according to an aspect of the present invention, a very short indicator, namely a 1 bit indicator in the case of the "UMTS HS-SCCH" may be used.

As mentioned above, the above described method according to the present invention may be adapted by processors in the mobile radio telecommunication system. Such processors may be arranged in any of the elements depicted in FIG. 1. The method according to this exemplary embodiment of the present invention may also be implemented by a computer program, which is executed on these processors. The computer program may be written in any suitable language, such as C++ or assembler. Furthermore, the program may be stored on a computer readable medium, such as a CD-ROM or may be downloaded into the working memories of the processors from networks such as the respective mobile telecommunication system or any data network or the WorldWideWeb.

The invention claimed is:

1. A method of transmitting data packets from a transmitter to a receiver,
    wherein an indicator is sent along with each data packet of the data packets;
    wherein the indicator indicates whether the respective data packet is a new data packet or a re-sent data packet;
    wherein, when the receiver receives a first data packet with an error, the receiver sends a negative confirmation (NACK) message to the transmitter;
    wherein, if the receiver subsequently decodes an error-free second data packet which was transmitted consecutively after the transmission of the first data packet and sent along with the indicator indicating that the second data packet is a new data packet, the receiver sends a revert (REV) confirmation message consequent on receiving the second data packet, the REV confirmation message acknowledges receipt of the second data packet and requests the transmitter to re-send the first data packet;
    wherein the REV confirmation message is a predetermined signal that informs the transmitter that a gap exists in a memory of the receiver due to a missing data packet transmitted consecutively before the second data packet, the missing data packet being (i) retransmitted without a delay, (ii) retransmitted with a delay or (iii) disregarded for retransmission; and wherein the REV confirmation message is transmitted when the receiver decodes an error-free second data packet transmitted consecutively after transmission of the first data packet and transmitted with a Network Data Incoming (NDI) indicator, the NDI indicator indicating that the second data packet is an unexpected new data packet.

2. The method of claim 1, wherein, when the receiver receives an error-free data packet, the receiver sends an acknowledgement confirmation (ACK) message to the transmitter.

3. The method of claim 1, wherein a third data packet without data is sent in response to the revert confirmation message, 4. The method of claim 1, wherein a third data packet is sent in response to the revert confirmation message with one of: a part of data originally included in the first data packet, and all of the data originally included in the first data packet.

5. The method of claim 1, wherein the transmitter ignores the revert confirmation message and sends a new third data packet.

6. The method of claim 1, wherein the indicator has a length of 1 bit.

7. The method of claim 1, wherein the method is an extension of the HARQ protocol in UMTS; and wherein the indicator is sent via the High Speed Shared Control Channel of UMTS.

8. A system for transmitting data packets from a transmitter to a receiver, comprising:
the transmitter and the receiver;
wherein the transmitter sends an indicator along with each data packet of the data packets;
wherein the indicator indicates whether the respective data packet is a new data packet or a re-sent data packet;
wherein, when the receiver decodes a first data packet with an error, the receiver sends a negative (NACK) confirmation message to the transmitter;
wherein, if the receiver decodes a second data packet without an error, which second data packet was transmitted consecutively after the transmission of the first data packet and sent along with the indicator which indicates that the second data packet is a new data packet after the receiver has sent the negative confirmation message with respect to the first data packet, the receiver sends a revert (REV) confirmation message to the transmitter consequent on receiving the second data packet;
wherein the revert confirmation message requests the transmitter to re-send the first data packet;
wherein the REV confirmation message is a predetermined signal that informs the transmitter that a gap exists in a memory of the receiver due to a missing data packet transmitted consecutively before the second data packet, the missing data packet being (i) retransmitted without a delay, (ii) retransmitted with a delay or (iii) disregarded for retransmission; and
wherein the REV confirmation message is transmitted when the receiver decodes an error-free second data packet transmitted consecutively after transmission of the first data packet and transmitted with a Network Data Incoming (NDI) indicator, the NDI indicator indicating that the second data packet is an unexpected new data packet.

9. The system of claim 8,
wherein the system is a UNITS mobile telecommunication system; and
wherein the indicator is sent via the High Speed Shared Control Channel of UMTS.

10. A base station for a mobile radio communication system,
wherein the base station comprises a transmitter for transmitting data packets to a receiver of the mobile radio communication system;
wherein the transmitter is adapted to send an indicator along with each data packet of the data packets;
wherein the indicator indicates whether the respective data packet is a new data packet or a resent data packet;
wherein, when the transmitter decodes a revert (REV) confirmation message that indicates that the receiver decoded a first data packet with an error and a second data packet without an error, the REV confirmation message is transmitted b the receiver consequent on receiving the second data packet, which second data packet was transmitted consecutively after the transmission of the first data packet and sent along with the indicator indicating that the second data packet is a new data packet, the transmitter is adapted to re-send the first data packet;
wherein the REV confirmation message is a predetermined signal that informs the transmitter that a gap exists in a memory of the receiver due to a missing data packet transmitted consecutively before the second data packet, the missing data packet being (i) retransmitted without a delay, (ii) retransmitted with a delay or (iii) disregarded for retransmission; and
wherein the REV confirmation message is transmitted when the receiver decodes an error-free second data packet transmitted consecutively after transmission of the first data packet and transmitted with a Network Data Incoming (NDI) indicator, the NDI indicator indicating that the second data packet is an unexpected new data packet.

11. A mobile subscriber station for a mobile radio communication system,
wherein the mobile subscriber station comprises a receiver for receiving data packets from a transmitter of the mobile radio communication system,
wherein the transmitter sends an indicator along with each data packet of the data packets;
wherein the indicator indicates whether the respective data packet is a new data packet or a re-sent data packet;
wherein, when the receiver decodes a first data packet with an error, the receiver is adapted to send a negative (NACK) confirmation message to the transmitter;
wherein, when the receiver decodes a second data packet without an error, which second data packet was transmitted consecutively after the transmission of the first data packet and sent along with the indicator indicating that the second data packet is a new data packet after the receiver has sent the negative confirmation message with respect to the first data packet, the receiver is adapted to send a revert (REV) confirmation message to the transmitter consequent on receiving the second data packet;
wherein the revert confirmation message acknowledges receipt of the second data packet and requests the transmitter to re-send the first data packet;
wherein the REV confirmation message is a predetermined signal that informs the transmitter that a gap exists in a memory of the receiver due to a missing data packet transmitted consecutively before the second data packet, the missing data packet being (i) retransmitted without a delay, (ii) retransmitted with a delay or (iii) disregarded for retransmission; and wherein the REV confirmation message is transmitted when the receiver decodes an error-free second data packet transmitted consecutively after transmission of the first data packet and transmitted with a Network Data Incoming (NDI) indicator, the NDI indicator indicating that the second data packet is an unexpected new data packet.

12. A non-transitory computer readable media comprising a computer program code configured to control transmission of data packets from a transmitter to a receiver of a mobile radio communication system, wherein, when the computer program is executed, the computer program causes that:

the transmitter sends an indicator along with each data packet of the data packets;

wherein the indicator indicates whether the respective data packet is a new data packet or a re-sent data packet;

when the transmitter decodes a revert (REV) confirmation message from the receiver that indicates that the receiver decoded a first data packet with an error and a second data packet, transmitted consecutively after the transmission of the first data packet, without an error, transmitter is adapted to re-send the first data packet;

wherein the REV confirmation message is transmitted by the receiver consequent on receiving the second data packet;

wherein the REV confirmation message is a predetermined signal that informs the transmitter that a gap exists in a memory of the receiver due to a missing data packet transmitted consecutively before the second data packet, the missing data packet being (i) retransmitted without a delay, (ii) retransmitted with a delay or (iii) disregarded for retransmission; and wherein the REV confirmation-message is transmitted when the receiver decodes an error-free second data packet transmitted consecutively after transmission of the first data packet and transmitted with a Network Data Incoming (NDI) indicator; the NDI indicator indicating that the second data packet is an unexpected data packet.

13. A method comprising:

sending a negative (NACK) confirmation message from a receiver indicating to the transmitter that an immediately preceding data packet is to be resent, and sending a revert (REV) confirmation message from the receiver if a subsequently received data packet includes an indicator that this received data packet is not a retransmission in response to the negative confirmation message, wherein the REV confirmation message is transmitted by the receiver consequent on receiving the subsequently received data packet;

wherein the revert confirmation message indicates to the transmitter that the received data packet has been received without error, and that the immediately preceding data packet before the received data packet is to be resent;

wherein the REV confirmation message is a predetermined signal that informs the transmitter that a gap exists in a memory of the receiver due to a missing data packet transmitted consecutively before the received data packet, the missing data packet being (i) retransmitted without a delay, (ii) retransmitted with a delay or (iii) disregarded for retransmission; and wherein the REV confirmation message is transmitted when the receiver decodes an error-free second data packet transmitted consecutively after transmission of the first data packet and transmitted with a Network Data Incoming (NDI) indicator, the NDI indicator indicating that the second data packet is an unexpected new data packet.

14. The method of claim 13, wherein the indicator indicates whether the received data packet is a newly transmitted data packet.

15. The method of claim 13, including receiving another data packet at the receiver and sending an affirmative (ACK) confirmation message from the receiver if an error is not detected in the another data packet.

16. A method comprising:

transmitting a data packet of a series of data packets from a transmitter to a receiver, receiving a revert (REV) confirmation message from the receiver indicating that the data packet has been received satisfactorily at the receiver and that an immediately prior data packet in the series of data packets is to be retransmitted, wherein the REV confirmation message is transmitted by the receiver consequent on receiving the satisfactorily received data packet; and selectively transmitting the immediately prior data packet, wherein the REV confirmation message is a predetermined signal that informs the transmitter that a gap exists in a memory of the receiver due to a missing data packet transmitted consecutively before the satisfactorily received data packet, the missing data packet being (i) retransmitted without a delay, (ii) retransmitted with a delay or (iii) disregarded for retransmission; and wherein the REV confirmation message is transmitted when the receiver decodes an error-free second data packet transmitted consecutively after transmission of the first data packet and transmitted with a Network Data Incoming (NDI) indicator, the NDI indicator indicating that the second data packet is an unexpected new data packet.

17. The method of claim 16, including selecting to transmit the immediately prior data packet based on a count of prior retransmissions of the immediately prior data packet.

18. The method of claim 16, including selecting to transmit an empty data packet in response to the revert confirmation message.

19. The method of claim 16, including receiving an affirmative (ACK) confirmation message and transmitting a next data packet of the series of data packets in response to the affirmative confirmation message.

20. The method of claim 19, including receiving a negative (NACK) confirmation message and retransmitting the next data packet in response to the negative confirmation message.

21. A system comprising at least one transmitter and at least one receiver, wherein each transmitter and receiver is configured to execute a protocol that includes three confirmation message types:

an affirmative confirmation (ACK) that signals o the transmitter that a most recently transmitted data packet has been received satisfactorily at the receiver;

a negative confirmation (NACK) that signals to the transmitter that the most recently transmitted data packet has not been received satisfactorily at the receiver and a revert confirmation (REV) that signals to the transmitter that the most recently transmitted data packet has been received and that an immediately prior transmitted data packet has not been received satisfactorily at the receiver, wherein the REV confirmation message is transmitted by the receiver consequent on receiving the most recently transmitted data packet;

wherein the REV confirmation message is a predetermined signal that informs the transmitter that a gap exists in a memory of the receiver due to a missing data packet transmitted consecutively before the most recently transmitted data packet, the missing data packet being (i) retransmitted without a delay, (ii) retransmitted with a delay or (iii) disregarded for retransmission; and wherein the REV confirmation message is transmitted when the receiver decodes an error-free second data packet transmitted consecutively after transmission of the first data packet and transmitted with a Network Data Incoming (NDI) indicator, the NDI indicator indicating that the second data packet is an unexpected new data packet.

* * * * *